Aug. 8, 1961  J. BALDYGA  2,994,960
HEIGHT GAUGE

Filed June 8, 1959  2 Sheets-Sheet 1

INVENTOR.
JOSEPH BALDYGA
BY Louis Chayka
ATTORNEY

Aug. 8, 1961  J. BALDYGA  2,994,960
HEIGHT GAUGE

Filed June 8, 1959  2 Sheets-Sheet 2

INVENTOR.
JOSEPH BALDYGA
BY Louis Chayka
ATTORNEY

United States Patent Office 2,994,960
Patented Aug. 8, 1961

2,994,960
HEIGHT GAUGE
Joseph Baldyga, 26501 Woodmont, Roseville, Mich.
Filed June 8, 1959, Ser. No. 818,800
1 Claim. (Cl. 33—170)

The invention pertains to a height gauge of the type which includes a vertical post mounted upon a horizontal base and having the form of a rack provided with teeth spaced from each other by a selected unit of linear measurement, a member slideably mounted on said post and including a horizontally extending arm, the relation of parts being such that the level of the arm as measured with respect to a stationary part such as the base, will be indicated by calibrations displayed on the post. However as the gauge is to serve as a precision instrument, the vertical slideable member carries for that purpose a micrometer head normally in engagement with said teeth of the rack.

While in general this type of a gauge is well known, the object of the improvement is to provide means whereby the sliding member with the micrometer head may be quickly shifted upon said post to a desired position. This may be effected by reason of a novel mechanism incorporated in said micrometer head. Another object of the invention is to provide a height gauge in which the vertical sliding member includes vertical surfaces embracing the post in a manner to prevent any play between said post and said sliding member.

Figure 1:
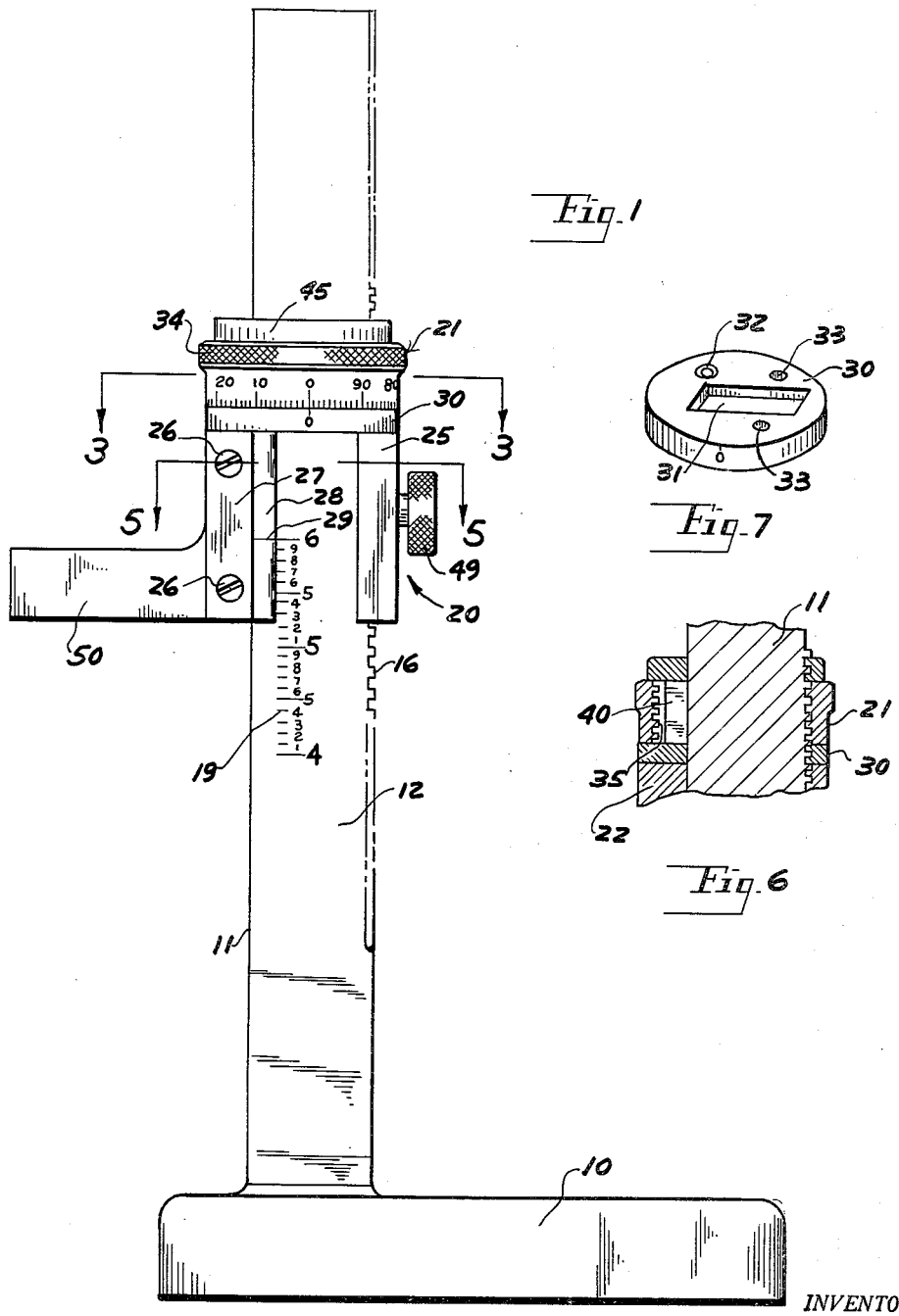
Figure 2:
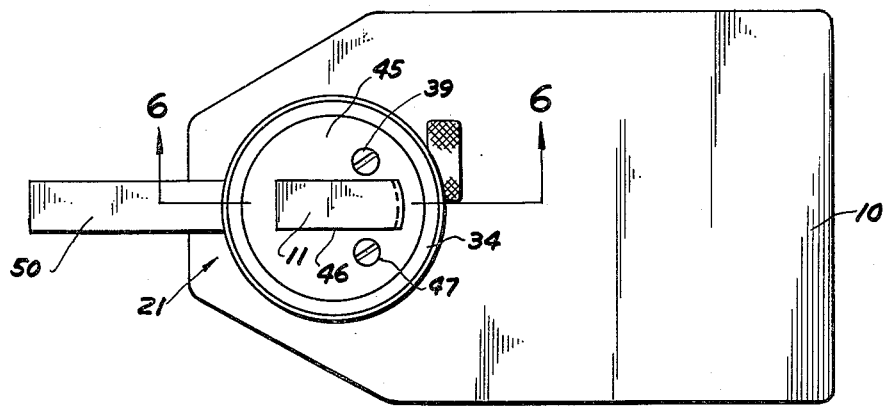
Figure 3:
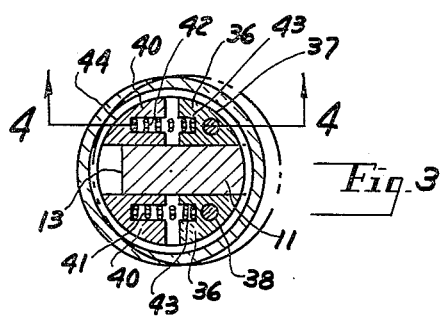
Figure 4:
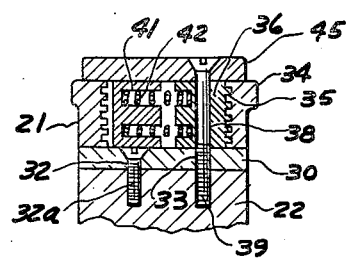
Figure 5:
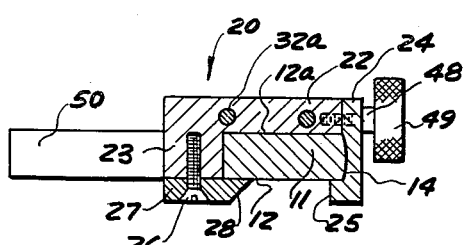

I shall now describe my improvement with reference to the accompanying drawings in which:

FIG. 1 is a side elevational view of the gauge;
FIG. 2 is a top elevational view thereof;
FIG. 3 is a sectional view on line 3—3 of FIG. 1;
FIG. 4 is a sectional view on line 4—4 of FIG. 3;
FIG. 5 is a sectional view on line 5—5 of FIG. 1;
FIG. 6 is a sectional view on line 6—6 of FIG. 2;
FIG. 7 is a perspective view of one component element of the gauge.

Similar numerals refer to similar parts throughout the several views.

The drawing in FIG. 1 disclosed the gauge which includes a flat oblong base 10 serving as a support for a vertical post 11. The post which is mounted upon one end portion of the base in order that it may be brought close to an object or a surface to be measured, has the form of a flat bar or rail. Specifically the post is defined by two parallel broad surfaces, one of which marked 12, may be regarded as the front surface of the post, while the other 12a will be considered the rear surface thereof, and by two narrow sides, one of which marked 13 is flat while the other marked 14 is arcuate. It is on this side that the post is formed into a rack including a plurality of teeth 16 in a vertical alinement and spaced from each other to a selected unit of measurement such as 0.1 of an inch.

Now I shall refer to the vertical sliding member generally identified by numeral 20 and to the micrometer head or barrel 21 associated therewith.

The sliding member consists of rail which is L-shaped in cross section as it includes a vertically disposed bar 22, disposed in parallel abutment with the rear face 12a of the post and a flange 23 integrally connected to the bar at right angle thereto and abutting the narrow side 13 surface of the post. Secured to the bar 22 in opposed relation to the flange 23 is a retaining plate 24 which includes a shoulder 25 jutting over the marginal portion of the front face of the post 11. Secured to the flange 23 of the L-shaped rail by screws 26 is a plate 27 which projects over the adjoining marginal portion of the front face of said post. The plate is defined in part by a bevelled face 28 sloping towards said front face of the post. A horizontal line 29 engraved or otherwise indicated on said bevelled face, serves as a reference line with respect to calibrations 19 displayed on the post.

Extending laterally from said flange 23, in alinement with the post 11, is a horizontal arm 50 which may serve as a mounting for a scriber or which may by itself serve as a means for contact with the object to which the gauge may be operatively applied.

Supported by the sliding member and secured to the top thereof is a horizontal disk 30. The disk is provided with a rectangular slot 31 of a size corresponding to the cross sectional dimensions of the post 11 which extends through said slot upwardly. In addition the disk has a plurality of holes for reception of screws which will be presently identified. One of the holes, 32, serves for reception of a screw 32a by means of which the disk is secured to the rail 22. Spaced from said hole 32 are two holes 33, one on each side of the slot. The disk serves as a supporting platform for a micrometer barrel 21 which is of the same diameter as the disk and which, on the outer surface, along its lower rim, is provided with a peripheral scale of calibrations, preferably ranging from 0 to 100. The barrel includes along its upper rim an integrally formed shoulder which is knurled for easier manual operation thereof. The inner surface of the barrel is threaded as shown at 35 to a pitch equaling the spacing between the individual divisions on the scale 19 on said post so that a full turn of the barrel will result in the linear movement of the drum to the distance of one such division. As each of the divisions on the post represents 0.1 of an inch each calibration on the drum will represent 0.001 of an inch.

Located within the barrel but secured to the disk 30, are two substantially wedge-shaped blocks 36, each of which is defined by two straight sides at right angle to each other and an arcuate side 37, joining the two sides and running parallel to the inner surface of the drum.

The two blocks straddle the post 11 being in a sliding abutment therewith. Each of the blocks has a vertical hole 38 in register with the respective hole 33 in the disk 30 for reception of a screw 39.

The two blocks 36 are stationary, being held against movement by said screws 39. Disposed within the same barrel 21, is another pair of blocks 40 which are identical in shape with blocks 36 except that they have no holes corresponding to holes 38. The two blocks 40 also straddle the post 11 but are kept normally in a yieldingly spaced relation to the first mentioned blocks 36 as shown in FIG. 3 by springs 41. To accommodate the springs each block 40 has a pair of sockets 42 in a vertical alinement as shown in FIG. 4. Each of the sockets holds one end portion of a coiled spring 42, the other end of the respective spring being disposed in a similar socket 43 in the opposed block 36. I wish to add that each block 40 is defined in part by an arcuate surface 44 disposed parallel to the inner surface of the barrel 21.

The upper surfaces of the blocks 36 and blocks 40 are set flush with the upper surface of the barrel 21. Superimposed upon the blocks and resting upon the upper rim of the barrel, is a cover 45 which is provided with a slot 46 to be occupied by the post 11, and with two vertical holes 47. The latter are intended for reception of the screws 39 already named herein. Since the screws are threaded into the body portion of the sliding member 20, the top 45 is kept in a stationary position above said ring but will permit linear horizontal movement thereof.

To conclude the description of the gauge, I wish to add that numeral 49 indicates a knob upon one end of a screw 48 which bears from outside against the member 24 and is threaded into the bar 22 as shown in FIG. 5.

The manner of operation of the gauge is quite obvious. Normally the sliding member is in a stationary position upon the post 11, this due to the fact that the inwardly threaded barrel 21 is in engagement with the rack teeth 16 on the post 11.

If it should be desired to move the sliding member 20 up or down, the barrel is shifted horizontally against the tension of the coil springs 42 between blocks 36 and 40 within the barrel, in the direction from the narrow side 13 of the post in the direction to the rack.

As a result, the threads of the barrel on its inner surface will be moved out of engagement with the teeth 16 of the rack which will permit the sliding member with its horizontal arm 50 to be moved quickly to any level with respect to said post. After the sliding member 20 has been thus brought to its desired position, the micrometer barrel may be employed to secure accurate measurements of the height which is to be gauged.

It will be understood that some changes may be made in my invention without departing from the inventive principle disclosed herein, what I therefore wish to claim is as follows:

In a height gauge including a vertical post provided with calibrations, the post being defined by two flat sides, and two transverse sides one of which is formed into a vertical rack, a member mounted upon the post for a vertical sliding movement thereon, the member including a circular horizontal platform having a slot therein for passage of the post therethrough, and being provided with a horizontal line for reference to the calibrations on the post, an internally threaded barrel coaxially seated upon the platform, a portion of the barrel opposite the rack being in mesh therewith while the diametrically opposite portion of the barrel is in a spaced relation to said post, a pair of stationary blocks mounted upon the platform within the barrel and being in abutment with the post from opposite flat sides thereof, a pair of movable blocks disposed within said barrel one on each flat side of the post, spring means between the blocks on each side of the post to keep them in a spaced relation to each other, said movable blocks bearing against the barrel from inside to hold it in mesh with the teeth of the rack, the barrel being adapted to be moved manually upon the platform against the tension of the springs to disengage said barrel from said rack, the peripheral portion of the barrel being provided with calibrations for reference to the calibrations of the post, and a cover disposed above the barrel and secured against movement to said vertically sliding member, said covering having a slot for passage of the post therethrough.

References Cited in the file of this patent

UNITED STATES PATENTS

| 1,105,549 | Cordier | July 28, 1914 |

FOREIGN PATENTS

| 395,514 | Great Britain | July 20, 1933 |